(12) United States Patent
Ruhlen et al.

(10) Patent No.: US 8,832,240 B2
(45) Date of Patent: *Sep. 9, 2014

(54) INTERFACING DISTINCT SERVICES FOR PROVIDING WEB BASED DOCUMENT MANIPULATION ACCESS

(75) Inventors: Matthew J. Ruhlen, Redmond, WA (US); Brian K. Dewey, Seattle, WA (US); Sam Franklin Williams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/462,248

(22) Filed: May 2, 2012

(65) Prior Publication Data

US 2012/0215888 A1  Aug. 23, 2012

Related U.S. Application Data

(63) Continuation of application No. 12/354,928, filed on Jan. 16, 2009, now Pat. No. 8,195,792.

(51) Int. Cl.
*G06F 15/16* (2006.01)
*G06F 9/54* (2006.01)
*H04L 29/08* (2006.01)
*G06F 9/50* (2006.01)

(52) U.S. Cl.
CPC ............ *G06F 9/54* (2013.01); *H04L 29/0809* (2013.01); *H04L 29/08072* (2013.01); *G06F 9/5055* (2013.01); *H04L 67/02* (2013.01)
USPC ............ 709/220; 709/203; 709/224; 709/228

(58) Field of Classification Search
CPC ............. H04L 29/06; H04L 29/08072; H04L 29/0809
USPC .................. 709/220, 224, 228, 203
See application file for complete search history.

(56) References Cited

U.S. PATENT DOCUMENTS

| 6,023,684 | A  | * | 2/2000 | Pearson ..................... 705/36 R |
| 6,708,215 | B1 | * | 3/2004 | Hingorani et al. ............ 709/229 |
| 7,367,044 | B2 | * | 4/2008 | Fowler et al. ..................... 726/1 |
| 2003/0233541 | A1 | * | 12/2003 | Fowler et al. ................ 713/155 |
| 2009/0064148 | A1 | * | 3/2009 | Jaeck et al. ................... 718/101 |

* cited by examiner

*Primary Examiner* — Khanh Dinh
(74) *Attorney, Agent, or Firm* — Steve Crocker; Jim Ross; Micky Minhas

(57) ABSTRACT

According to some embodiments, a callback interface for web accessible services is provided. A Uniform Resource Locator (URL) or similar address is issued by a host associated service to the user. User's browser provides the URL to an activity service, which on the user's behalf contacts the host service indicated by the URL and supporting the callback interface. The activity service then facilitates the user's requests on documents maintained by the host service through stateless calls to the host service providing web accessible services such as document manipulation, image processing, and similar ones.

20 Claims, 6 Drawing Sheets

INTERFACING DISTINCT SERVICES FOR PROVIDING WEB BASED DOCUMENT MANIPULATION ACCESS

This utility patent application is a continuation of U.S. patent application Ser. No. 12/354,928 filed on Jan. 16, 2009. The benefit of the earlier filing date of the parent applications is hereby claimed under 35 U.S.C. §120. The parent application is incorporated herein by reference.

BACKGROUND

One of the major contributions of computers and software to people's daily lives was the automation of widely used tasks such as word processing and spreadsheet calculations. Not only did word processing, spreadsheet, and similar applications automate and make those tasks usable by anyone, but they also added many new capabilities in manipulating a wide range of documents and data. Until recently, a typical environment included a standalone or networked computer with a particular application installed on it. Thus, the user was working with an application installed and executed on their local computer using data also stored locally. One disadvantage of this approach is that applications may have to be reinstalled every time an updated version is available, the computing device is replaced, etc.

A recent trend in providing the same document creation and manipulation capabilities without the burden of having a full scale application installed on the user's computer is enabling users to perform the same tasks through web access. In a typical web access service, the user may utilize a hosted service to create new documents, manipulate existing ones through a networked medium such as the Internet. The documents may be stored by the hosted service or at the user's local computer. However, as networked communication and Internet capabilities progress, the one application—one service model is changing too with some of the desired configurations not being addressed by conventional systems.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a callback interface for web accessible services, where a resource identification address provided by a host service to a user is utilized to access the service provider and facilitate communication with the user enabling the user to create and manipulate documents.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
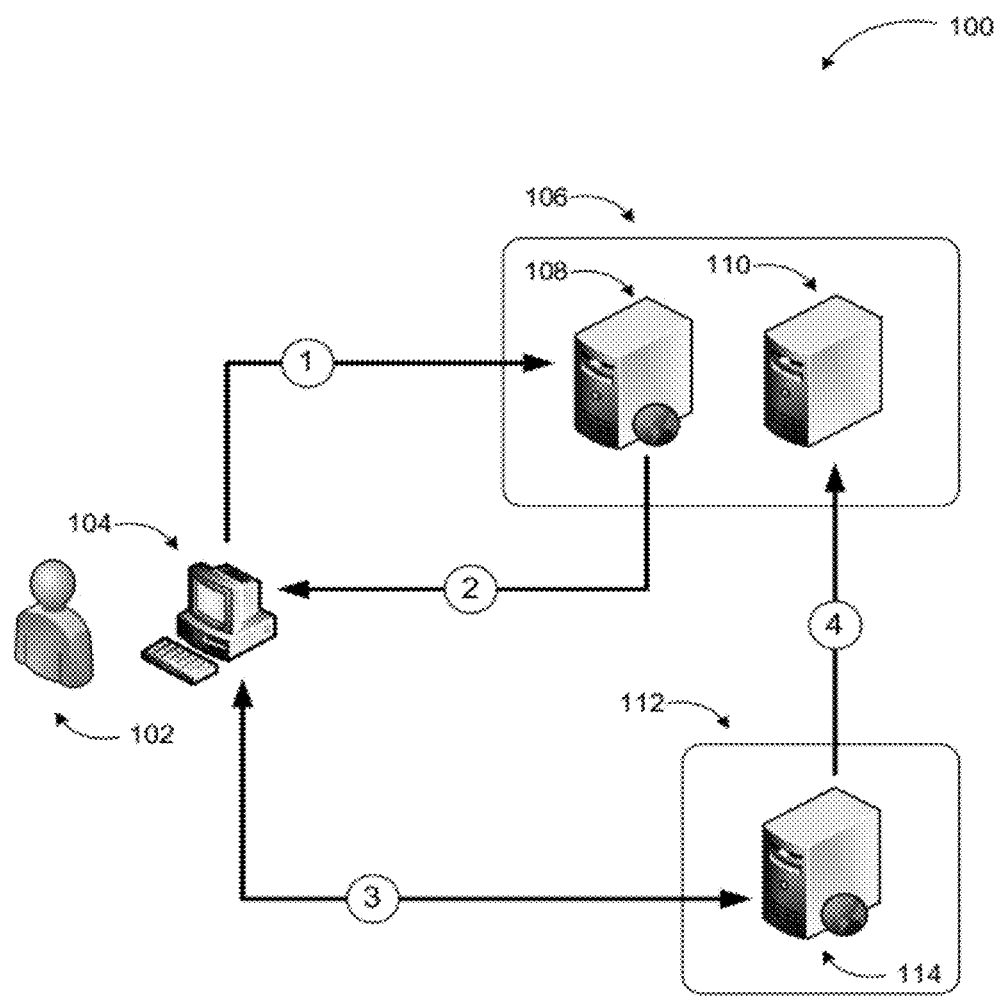
FIG. 1 is a conceptual diagram illustrating an example web accessible service system with a single host service, where embodiments may be implemented.

As briefly described above, user sessions with a web accessible service provider may be mediated through an activity service utilizing a network identifier for the host service provider. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for interfacing distinct web services. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "document" as used in conjunction with web accessible services is not limited to text based word processing documents, spreadsheets, presentations, or similar ones. Web accessible services may be provided for other purposes as well, such as image processing.

Referring to FIG. 1, diagram 100 of an example web accessible service system with a single host service, where embodiments may be implemented, is illustrated. By facilitating web access sessions through an intermediary service such as activity service, separate entities are enabled to provide a web service involving documents to interface with the activity service and allow the activity service to discover information related to a document and manipulate the document on the user's behalf While remote access to document services may be provided by tunneling a user interface through the host, an interface according to embodiments provides the flexibility to simplify host user interaction.

Hosted web access services provide their users a variety of functionality including viewing and editing of documents by the users based on access permission defined by the user. In a system according to embodiments, the host service does not need to tunnel a user interface for an application for editing a particular document type (e.g. spreadsheet application, word processing application, presentation application, and similar ones) to the user. Instead, users may be enabled to access, edit, and create their documents through a generic application user interface such as a browser application. Thus, the host service, directs the user's browser to a specific URL hosted by an activity server in response to their user's action that indicates a desire to view, create, or edit a document. The documents are commonly held by the host service and only accessed by the activity service.

According to some embodiments, a callback interface for web accessible services is provided. A Uniform Resource Locator (URL) or similar address is issued by a host associated service to the user. User's browser provides the URL to an activity service, which on the user's behalf contacts the host service indicated by the URL and supporting the callback interface. The activity service then facilitates the user's session with the host service through stateless calls to the host service enabling the host service to provide web accessible services such as document manipulation, image processing, and similar ones. Thus, the initial entry point to the activity service from the host only contains URL based information.

In the example system 100 of FIG. 1, host service 106 maintains documents for users such as user 102 through server 110. User 102 may access the system through a generic application such as a browser executed on computing device 104. To initiate the service, user 102 requests from server 108 of the host service 106 a particular activity (action 1). Server 108, in response, returns a URL to activity service 112 (action 2). User's browser application navigates to server 114 of activity service 112 (action 3). Communications between computing device 104 and server 114 (action 3) are related to the functionality of the application associated with the requested document, while the communication between server 114 and server 110 (action 4) is limited to interactions related to the document, mostly in terms of reads, writes, and permission checks.

Thus, application service is actually provided by activity service 112 through execution on server 114. Server 114 makes method calls to server 110, maintaining the document, to find out information about the document from the host on behalf of the user 102. It should be noted that there explicitly is no session state maintained by server 110 for the purposes of providing application functionality. If any state needs to be maintained, it may be done so by activity service 112.

According to embodiments, a system is provided where a new host may provide new application functionality for documents simply by providing a specific set of reasonably generic document functionality (read, write, lock, etc). This is contrasted with the relatively complex and specialized application specific functionality provided by the application (e.g. bold, commenting, spell check, revision tracking, and so forth).

Figure 2:
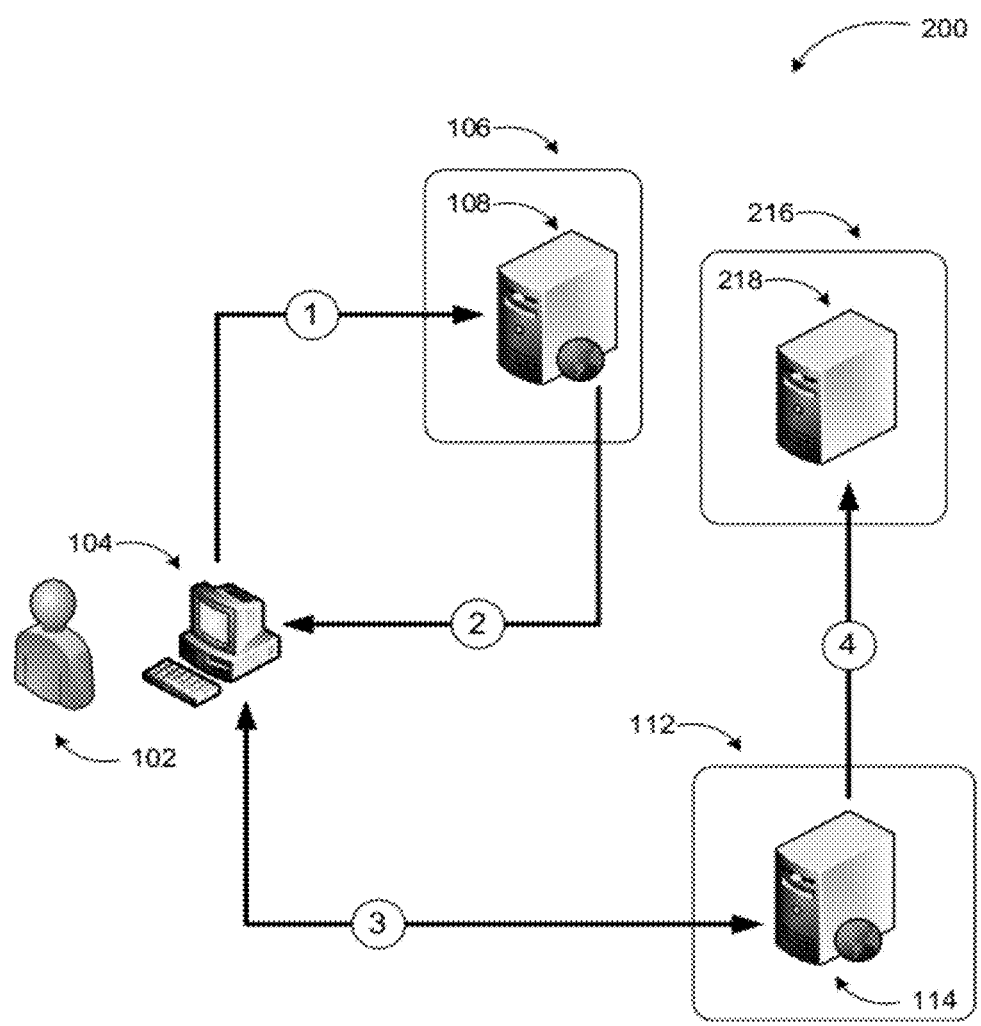
FIG. 2 is a conceptual diagram illustrating another example web accessible service system with two separate host services.

FIG. 2 is a conceptual diagram illustrating another example web accessible service system with two separate host services. Components and actions in diagram 200 that are numbered likewise to the components and actions of diagram 100 in FIG. 1 are similar in form and functionality. As discussed in more detail below, the computing devices (e.g. servers), applications (e.g. user's browser, host service), and configurations shown in FIGS. 1 and 2 are for illustration purposes only and do not constitute limitation on embodiments. Other components, software or hardware, and configuration may be employed for providing a callback interface to enable users access web based functionality through an activity service.

The distinct host service, activity service structure according to embodiments may be extended to multiple services providing separate but related services. For example, distinct activity services 112 may be provided based on an application type (e.g. one for word processing applications, one for spreadsheet applications, etc.), and all of these services supported by the same host service 216 maintaining the document(s). The architecture shown in diagram 200 is one example of such an extension into multiple services. Embodiments are not limited to this example architecture, however.

Differently from the system of diagram 100, the system in diagram 200 includes two distinct host services. Server 108 of host service 106 provides the URL (or similar network address) for the activity service 112 to contact host service 216, which is a distinct and separate service executed on server 218 maintaining the documents processed by activity service 112 for user 102. For example, host service 106 may be a web service providing users a selection of activities from a variety of web access services such as access to word processing services, spreadsheet services, presentation services, image processing services, and comparable ones. One or more of those services may be provided by activity service 112 with access to documents maintained by host service 216 executed on server 218.

According to another embodiment, machines/infrastructure that provide a web user interface to the user 102 and shows them their files may be a separate and distinct service from the machines/infrastructure that implement an endpoint that provides service 112 and the ability to manipulate document(s) for user 102.

Figure 3:
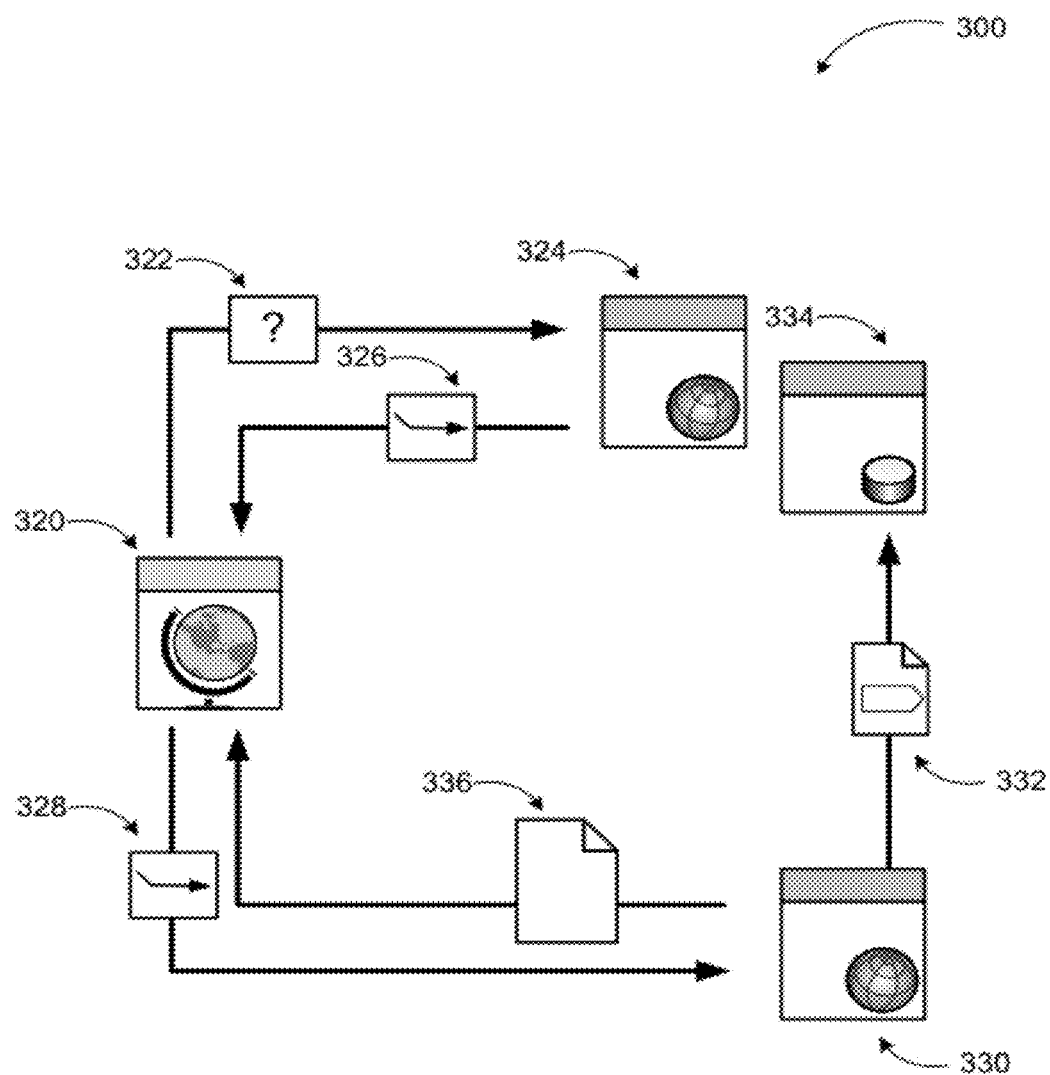
FIG. 3 illustrates exchange of messages and documents among major components of a system according to embodiments.

FIG. 3 illustrates exchange of messages and documents among major components of a system according to embodiments. As discussed previously, the operations in a system according to embodiments begin with user's browser application 320 connecting (322) to the host service web site 324 requesting a URL for a selected activity. The host service provides the user's browser 320 with the URL (326), which is forwarded (328) to activity service 330. The activity server 330 contacts (332) the host service 334 and places calls for processing documents in response to user requests (336) to facilitate editing, creation, or viewing of user document(s), which may be stored by host service 334.

According to some embodiments, activity service 330 is a separate Internet facing service, with a different domain. It is loosely coupled with host services 324 and 334, meaning knowledge required to facilitate the communication between the activity service 330 and the host services is minimized (e.g. a simple URL). At the same time, the activity service's goal is to mediate the web based functionality for the user to view and edit their documents. Functionality to interact with the user document that is being held by the host service is provided at the activity service. This is accomplished through two communication means: first the URL enabling host service 324 to communicate with activity service 330, second a service-host-interface (SHI) employed by the activity service to communicate with host service 334. Thus, a system is provided where activity service provides new application functionality for documents simply by providing a specific set of reasonably generic document functionality (read, write, lock, etc) at the host service.

According to some embodiments, activity service 330 contacts host service 334 when it needs to interact with the document and thus may do so from time to time. However, there may be cases, particularly with regard to viewing documents, where activity service 330 may not need to contact host service 334 at all, if activity service 330 has maintained a cached state for a specific document to be viewed and, therefore, has no questions it needs to ask host service 334.

The main purpose of host service 324 is to direct the user through his/her browser to activity service 330 and inform the activity service about the location of host service 334 which maintains document(s) for the user. Activity service 330 provides application functionality depending on the document type by accessing the document(s) at host service 334 through a basic set of commands According to one embodiment, the URL has four key aspects: (1) it points to the activity service; (2) it indicates what action the user wishes to do with the document (e.g. "edit a spreadsheet" or "view a presentation", and similar ones); (3) it contains information regarding where the host service implementing the SHI (host service 334) is located (this is also referred to as the Cluster Hint); and (4) it contains an arbitrary string created by the host service for uniquely identifying the document. This string is referred to as FileRep in the example scenarios and implementation below. The activity service does not obtain any information from the contents of the FileRep, but rather treats it as an opaque token. This allows the host service flexibility in creating FileReps, which best suit their infrastructure. According to other embodiments, additional information may also be included in the communication through the URL to enhance the services provide using the SHI.

Upon receiving the URL from host service 342, the user's browser navigates to the host service generated URL, at which point they are visiting an activity service server and the browser no longer needs to communicate with a host service server in order enable the desired functionality. Calls to the host service are made directly by the activity service servers via the SHI. The SHI calls may be made to the service endpoint described in the Cluster Hint, and include two particular pieces of information (in addition to any information that may be specific to a particular method): the FileRep, and the identity of the user who has visited the activity service. Some SHI calls and URLs may contain a FolderRep rather than a FileRep, which is similar to a FileRep but identifies a file collection maintained by the host rather than a single file. According to one embodiment, the URL from the host may not distinguish between FileReps and FolderReps treating them both as object representations.

As mentioned above, activity service 330 submits calls to host service 334 to enable user desired operations at the activity service. Some of the example methods according to embodiments may include: A first call made by the activity service to the host service for all cases may be CheckObjectInfo. This method is a query method in the SHI, which asks the host service to provide information about the object to WAC. The object may be, as discussed above, a file or a folder. Since the call made by the activity service also include the user's identity, certain information provided by the host service in the return is relevant only in the context of that specific user. This includes permission properties, which are discussed in more detail below. Some of the properties included in the host service's response to CheckObjectInfo may include: SupportedScenarios—the host service may be able to choose, which portions of the SHI they actually want to support for the particular object (e.g. file), although it is possible the answer may be the same for all files at the particular the host service. For example, the host service may choose to support viewing, which requires implementing CheckObjectInfo and GetFile (discussed below), or it may also choose to support FileEditing, which may require implementing several more methods and may be more technically challenging.

Other properties that may be received from the host service through the SHI in response to CheckObjectInfo include: IsFolder—to indicate whether the object is a file or folder; VersionRep—a string that is modified whenever the document being held by the host service changes; UserRights—a list of the user's permissions on the document; CurrentLock—a current value of a lock placed on the document if the host service supports locking of files; FilePartitionInfo—since the activity service does not process the document itself, it does not have a way to partition documents for storage and, thus, may rely on the host service to provide a partitioning scheme.

More generally, any information needed by the activity service from/about the host service in order to accomplish the user's goals, that information may be obtained using CheckObjectInfo rather than having other data deployed to the activity service that knows about the host service's specific parameters. This approach enables the activity service to support a new host service without preparation on the activity service side (maybe with the exception of some security measures).

GetFile is another method for receiving the contents of a file from the host. Methods associated with locking files include: PutFile, Lock, Unlock, UnlockAndRelock, and RefreshLock. These methods all provide an expected lock value of the file and are executed by the host service if the expected lock value matches the current lock value maintained by the host service. PutFile is for a binary overwrite of the existing file. Lock locks the file with a newly provided value (this command may implicitly expect the current lock value to the "unlocked"). Unlock removes the existing lock. UnlockAndRelock unlocks the file with the expected lock value and then takes a new lock with the newly provided value. RefreshLock extends the timeout of the existing lock.

DeleteFile deletes the file. Other methods may be associated with related files. For example, a method may not operate on the file identified by the FileRep, but instead take an additional parameter which provides the name of a sibling, and operate on the sibling file (the sibling name is not a FileRep but is instead an actual file name the host service may choose to either support or reject with an error indicating the name is invalid). Of course, a similar operation may be performed on folders.

EnumerateSiblings and EnumerateChildren methods are used for enabling the host service to provide information about collections of files, the first takes a FileRep and the second takes a FolderRep. In both cases the returns are an array of CheckFileInfo responses. PutNewChild and PutNewSibling provide a binary stream of the entire file to create/overwrite rather than making a storage request. PutNewChild takes a FolderRep, a relative name, a Can Overwrite flag, and operates on a new file in the collection identified by the relative name. If the relative name is invalid for any reason and error may be received. PutNewSibling performs a similar operation on a sibling file of the file specified by the FileRep rather than a child file within the folder specified by the FolderRep.

According to one embodiment, the activity service side of the service may not perform authorization and rely on the host service to provide that information in CheckFileInfo. The SHI may also expect the host service to validate the user's authorization as part the host service's execution of each SHI method. This may require the host service and the activity service to have a common authentication scheme where the activity service can both determine the identity of the user and provide the host service with user identity information that can be validated and trusted. This user identity information may be provided by the activity service on every SHI method call.

Following is an example URL directing a user to a web access service for a presentation application (live.com® website and POWERPOINT® application by MICROSOFT CORP. of Redmond, Wash.):

http://powerpoint.office-apps.live.com/PowerPoint-Frame.aspx?
PowerpointView=ReadingView&Fi=somefilerep&H= OLW&C=0_10.10.1.1_905 &ui=en-US&rs=en-US, where, following parameters are employed:
Fi: FileRep;
H: Allows the host service to self-identify itself;
C: ClusterHint directing to the host service endpoint, in the form: ServiceBindingType_ServerName/IP_ServicePort;
Ui: user's user interface (browser) language; and
RS: document's language.

The above discussed scenarios, example systems, applications, and commands are for illustration purposes. Embodiments are not restricted to those examples. Other applications, configurations, communication modes, and commands may be used in implementing a callback interface for providing web based document manipulation access through distinct services in a similar manner using the principles described herein.

Figure 4:
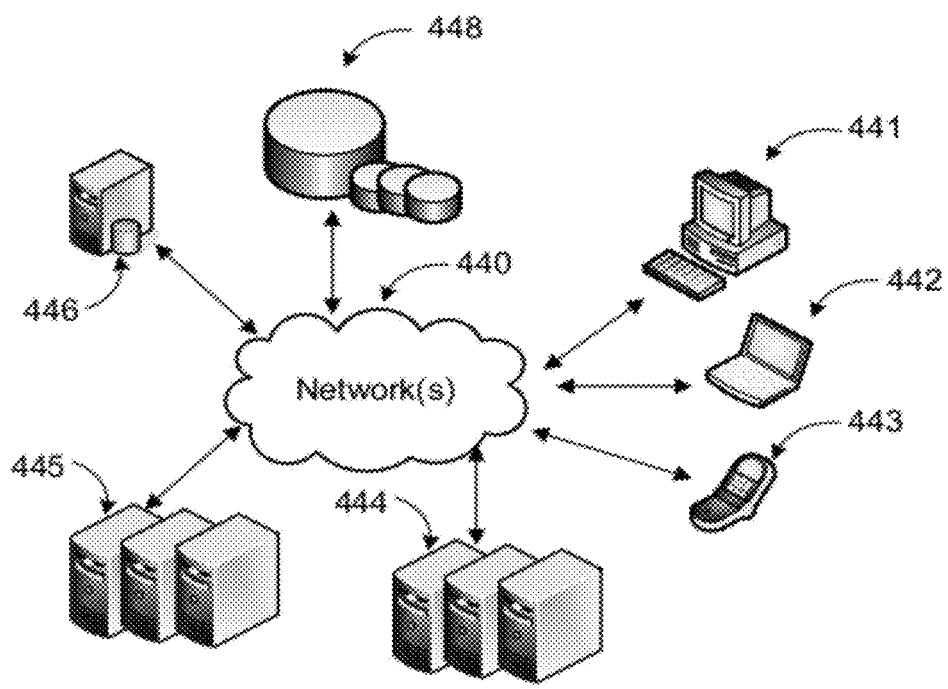
FIG. 4 is a networked environment, where a system according to embodiments may be implemented.

FIG. 4 is an example networked environment, where embodiments may be implemented. A platform providing activity services in conjunction with web access host services may be implemented via software executed over one or more servers 444 such as a hosted service. The platform may communicate with client applications (e.g. browsers) on individual computing devices such as a smart phone 443, a laptop computer 442, and desktop computer 441 (client devices) through network(s) 440. Host services may be executed on a separate group of servers 445.

As discussed above, users may be provided a network address along with additional information for contacting the host service by one of the host service's servers or by an independent service provider. The user's browser may then be directed to the activity service, which contacts the indicated host service server and facilitates the user's manipulation of one or more documents (files) maintained by the host service employing method calls to the host service. Information associated with user and facilitating web access services may be stored in one or more data stores (e.g. data stores 448), which may be managed by any one of the servers 445 or by database server 446.

Network(s) 440 may comprise any topology of servers, clients, Internet service providers, and communication media. A system according to embodiments may have a static or dynamic topology. Network(s) 440 may include a secure network such as an enterprise network, an unsecure network such as a wireless open network, or the Internet. Network(s) 440 may also coordinate communication over other networks such as PSTN or cellular networks. Network(s) 440 provides communication between the nodes described herein. By way of example, and not limitation, network(s) 440 may include wireless media such as acoustic, RF, infrared and other wireless media.

Many other configurations of computing devices, applications, data sources, and data distribution systems may be employed to implement a system for providing web access services through an activity service. Furthermore, the networked environments discussed in FIG. 4 are for illustration purposes only. Embodiments are not limited to the example applications, modules, or processes.

Figure 5:
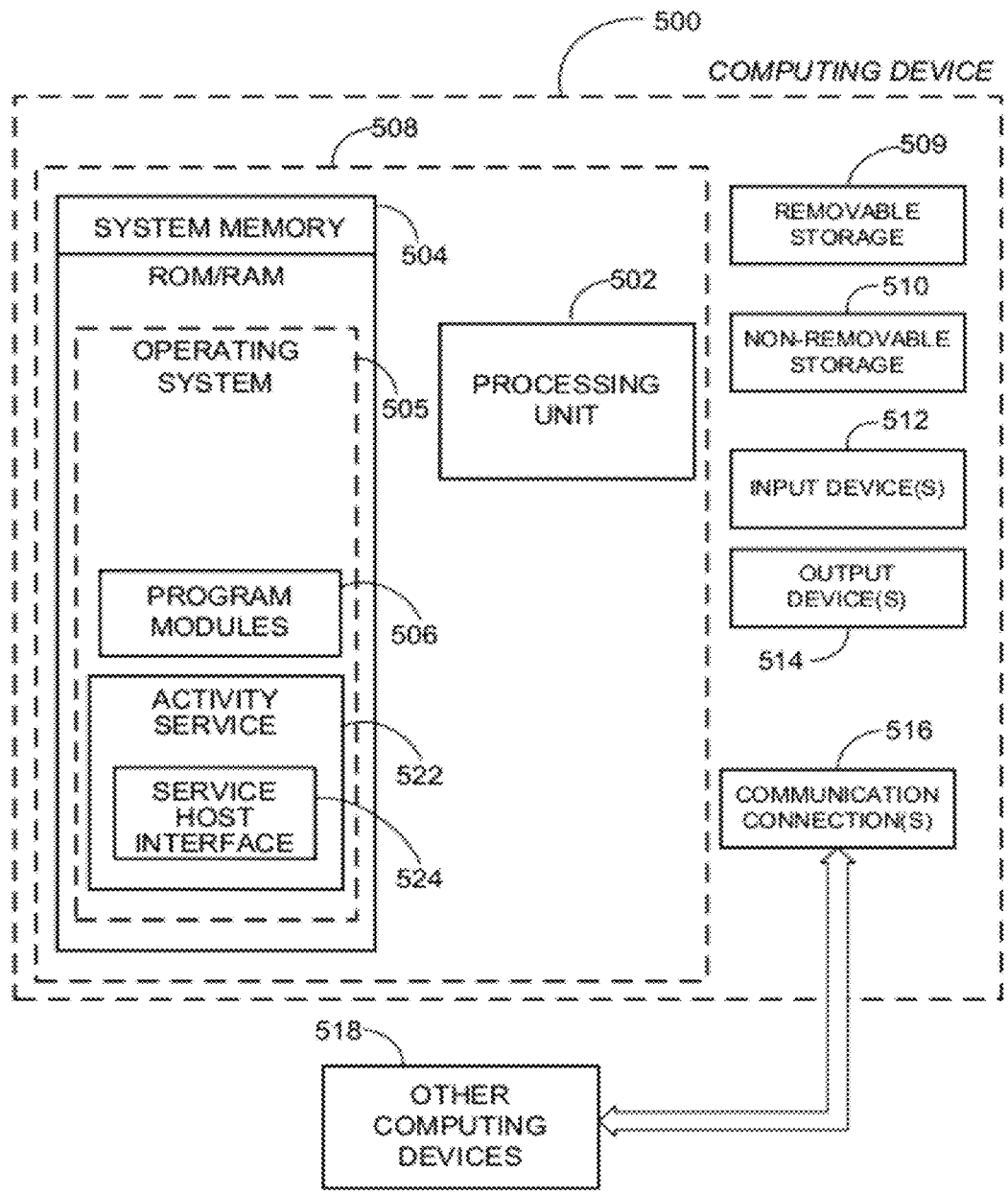
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server of an activity service mediating web access services for a host service and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, activity service 522, and service host interface (SHI) 524.

Activity service 522 may be any service that performs document based web service activities for a user through communication between client applications and host services. SHI 524 may manage communication with the host service placing method calls in response to user requests as discussed previously. SHI 524 and activity service 522 may be separate applications or integral modules of a hosted service that provides communication services to client applications/devices. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, host service servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
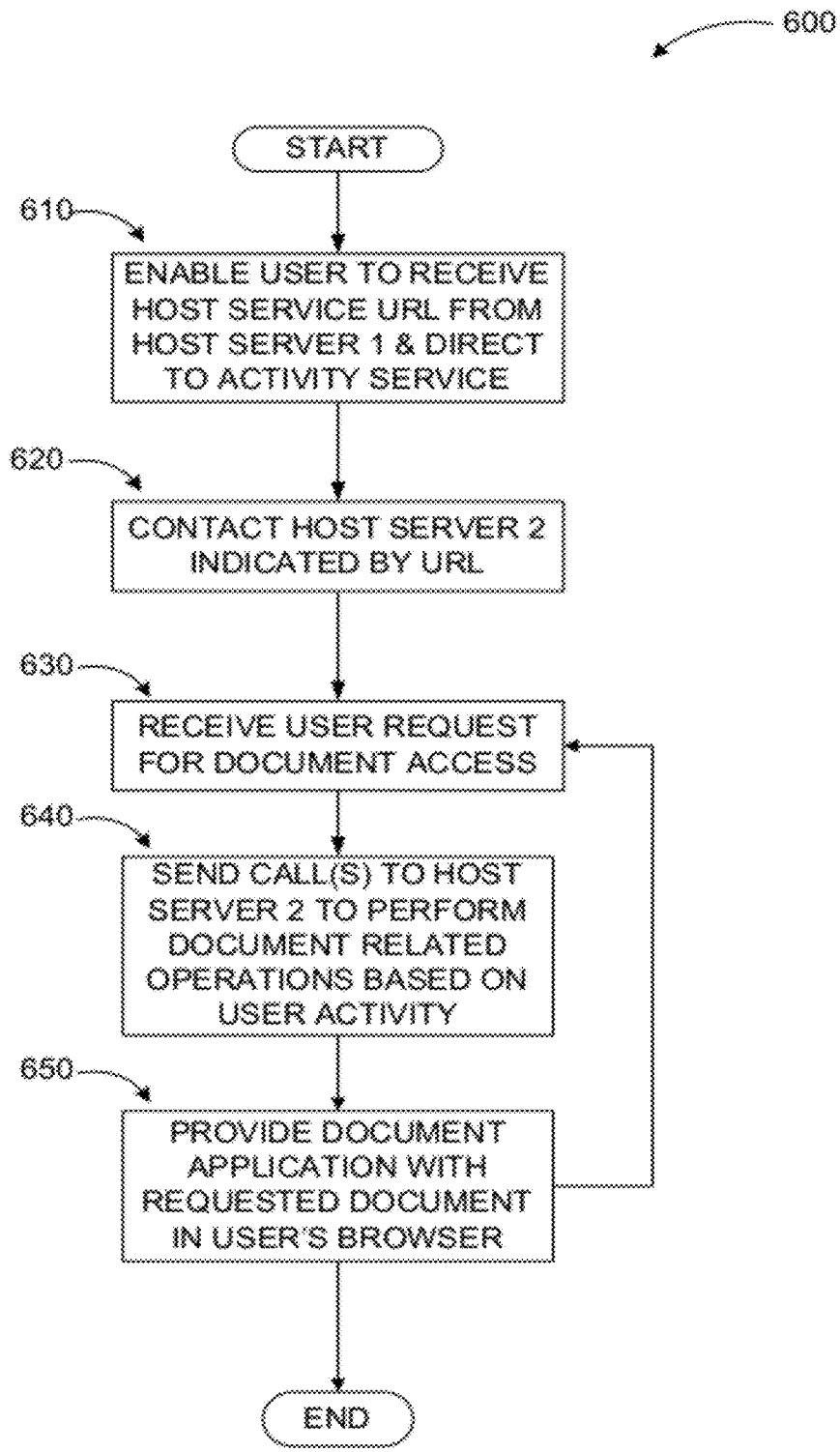
FIG. 6 illustrates a logic flow diagram for a process of providing web accessible services according to embodiments.

FIG. 6 illustrates a logic flow diagram for process 600 of providing web accessible services according to embodiments. Process 600 may be implemented as part of an activity service as discussed in FIG. 3.

Process 600 begins with operation 610, where the user is provided with a URL for the host service from a server of the same or a different host service. In practice, the user may browse to a website and presented options for selecting a document related action such as editing a word processing document, a spreadsheet document, an image document, and so on. Upon making a selection, the user's browser may be directed to the activity service with the URL indicating which host service to contact and additional information as discussed previously.

At operation 620, the activity service contacts the intended host service, the user may be authenticated to the host service. At following operation 630, a request for an action is received from the user such as viewing a document, editing a document, and comparable ones. The requested actions are performed by the activity service based on user activity on the document maintained by the host service through calls to the host service at operation 640. As discussed previously, some actions may not necessitate repeated contacting of the host service, if a cached state for the document is maintained at the activity service. The document application is provided with the requested document in the user's browser by the activity service at operation 650. The operations 630 through 650 may be iterative, where each request from the user is handled in a similar manner with appropriate methods used each time.

The operations included in process 600 are for illustration purposes. An activity service for facilitating web access document manipulation functionality and a callback interface for interactions with host services may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part by a host service computing device for providing services to a document, the method comprising:
   receiving, at the host service, a request for service to the document;
   in response to receiving the request for service to the document, generating, at the host service, a Uniform Resource Locator (URL) identifying the host service maintaining a stateless session and the document maintained by the host service, the URL including:
      a location of an activity service,
      an action associated with the document,
      a location of the host service implementing a service host interface (SHI), and
      an identifier associated with the document or a collection of files;
   sending stateless calls from the activity service to the host service, identified by the URL, maintaining the document for a user, at least one of the stateless calls for receiving document contents identified by the URL; and
   facilitating by the activity service rendering of a document editing user interface in a browser application associated with the user depending on a type of the document maintained by the host.

2. The method of claim 1, further comprising:
   receiving at the host service, a call from the activity service to the service host interface (SHI) of the host service.

3. The method of claim 1, wherein the service host interface (SHI) is employed by the activity service for providing access to the document on the host service.

4. The method of claim 3, wherein the identifier refers to a collection of files maintained by the host.

5. The method of claim 3, wherein an initial SHI call received by the host service includes one of:
   a query method call including user identity and user permission properties, and
   a retrieval method call for receiving document contents of a file.

6. The method of claim 5, wherein the query method call received by the host service includes at least one from a set of: a supported scenarios property defining a portion of the SHI to be employed, a folder property defining whether a requested object is the file or a folder, a version property defining a version of the document, a user rights property defining a list of user permissions, a current lock property defining a current value of a lock placed on the document, and a file partition property defining a partitioning scheme for storing the document at the host service.

7. The method of claim 6, further comprising:
receiving the query method call providing an expected lock value of the file and if the expected lock value matches the current lock value maintained by the host service, executing one of: binary overwriting of the file, locking the file with a newly provided value, removing the lock, unlocking the file with the expected lock value and then taking a new lock with a newly provided value, and extending a timeout of the lock.

8. The method of claim 6, further comprising:
receiving the query method call for deleting one or more designated files at the host service.

9. The method of claim 6, further comprising:
receiving one of a first enumeration method call and a second enumeration method call for enabling the host service to provide information about collections of files, wherein the first enumeration method call takes a file identifier and the second enumeration method call takes a folder identifier, and wherein returns of both method calls are an array of responses for the query method call.

10. The method of claim 1, further comprising:
enabling a method call to operate on a sibling file identified by a parameter in addition to a file identifier parameter defining a target file.

11. The method of claim 10, further comprising:
receiving a first create method call for providing a binary stream of the file to one of create and overwrite instead of making a storage request, wherein the first create method call takes a folder identifier parameter, a relative name, an overwrite flag, and operates on a new file in a collection identified by the relative name.

12. The method of claim 10, further comprising:
receiving a second create method call for providing a binary stream of the file to one of create and overwrite instead of making a storage request, wherein the second create method call performs one of a create and overwrite operation on the sibling file specified by a folder identifier parameter associated with the second create method call.

13. A host device for providing a web access service to a document, the host device comprising:
a memory for storing computer executable instructions; and
a processor for executing the computer executable instructions, the instructions including:
receiving, at a host service, a request for service to the document;
in response to receiving the request for service to the document, generating, at the host service, a Uniform Resource Locator (URL) identifying the host service maintaining a stateless session and the document maintained by the host service, the URL including:
a location of an activity service,
an action associated with the document,
a location of the host service implementing a service host interface (SHI), and
an identifier associated with the document or a collection of files;
sending stateless calls from the activity service to the host service, identified by the URL, maintaining the document for a user, at least one of the stateless calls for receiving document contents identified by the URL; and
facilitating by the activity service rendering of a document editing user interface in a browser application associated with the user depending on a type of the document maintained by the host.

14. The host device of claim 13, wherein the document is one from a set of: a word processing document, a spreadsheet document, a presentation document, a calendar document, and an image document, and wherein the URL further includes information associated with a browser language and an object language.

15. The host device of claim 13, wherein the activity service relies on the host service to provide authorization information in an initial query method call.

16. The host device of claim 13, wherein an authorization of the user associated with a client device is validated by the host service as part the host service's execution of each service host interface (SHI) method call.

17. The host device of claim 16, wherein an identity of the user associated with the client device is determined by the activity service and a validated and trusted user identity information is provided to the host service through a shared common authentication scheme.

18. The host device of claim 17, wherein the user identity information is provided to the host service on each SHI method call.

19. A computer-readable memory device with instructions stored thereon for providing a service at a host device from an activity service, the instructions comprising:
receiving, at the host service, a request for service to a document;
in response to receiving the request for service to the document, generating, at the host service, a Uniform Resource Locator (URL) identifying the host service maintaining a stateless session and the document maintained by the host service, the URL including:
a location of an activity service,
an action associated with the document,
a location of the host service implementing a service host interface (SHI), and
an identifier associated with the document or a collection of files;
sending stateless calls from the activity service to the host service, identified by the URL, maintaining the document for a user, at least one of the stateless calls for receiving document contents identified by the URL; and
facilitating by the activity service rendering of a document editing user interface in a browser application associated with the user depending on a type of the document maintained by the host.

20. The computer-readable memory device of claim 19, wherein the action is facilitated through one of more of: a query method call for viewing the document, a retrieval method call for viewing and retrieving the document contents, and an edit method call for editing the document.

* * * * *